Oct. 21, 1958  W. HAUPT  2,856,787
VARIABLE TRANSMISSION GEARING FOR USE IN TAXIMETERS
Original Filed May 24, 1955  4 Sheets-Sheet 1
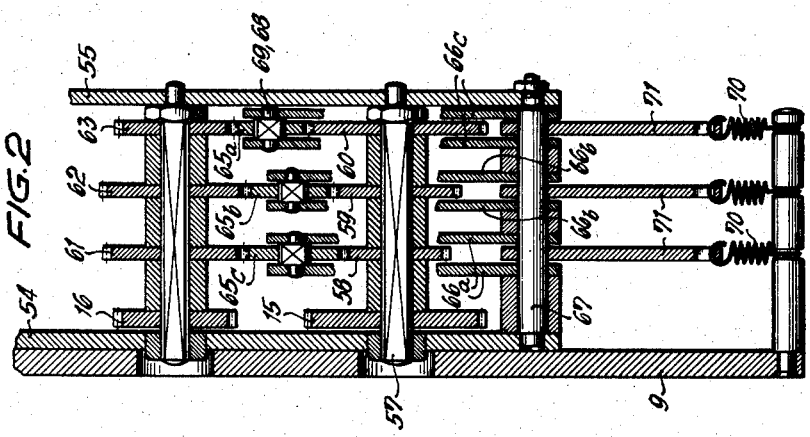
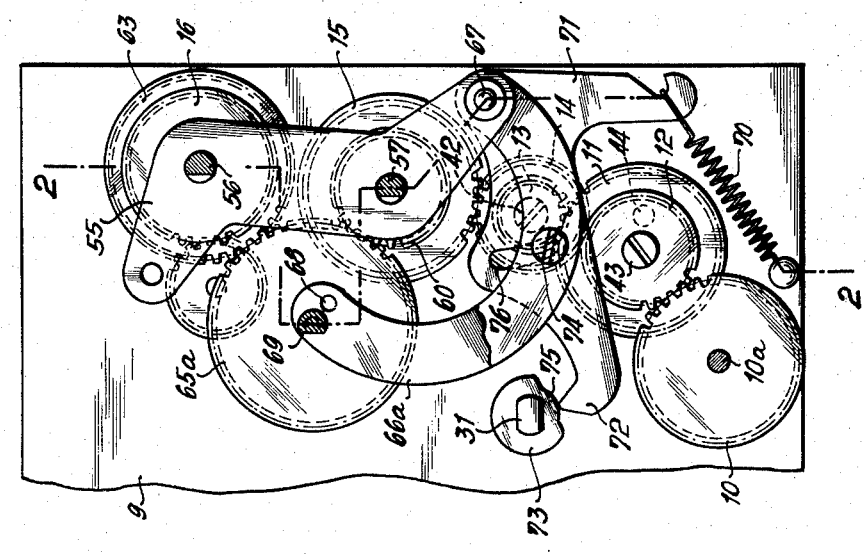
INVENTOR
Wilhelm HAUPT
By Irwin S. Thompson
ATTY.

Oct. 21, 1958 W. HAUPT 2,856,787
VARIABLE TRANSMISSION GEARING FOR USE IN TAXIMETERS
Original Filed May 24, 1955 4 Sheets-Sheet 3

INVENTOR
Wilhelm HAUPT
By Irwin A. Thompson
ATTY.

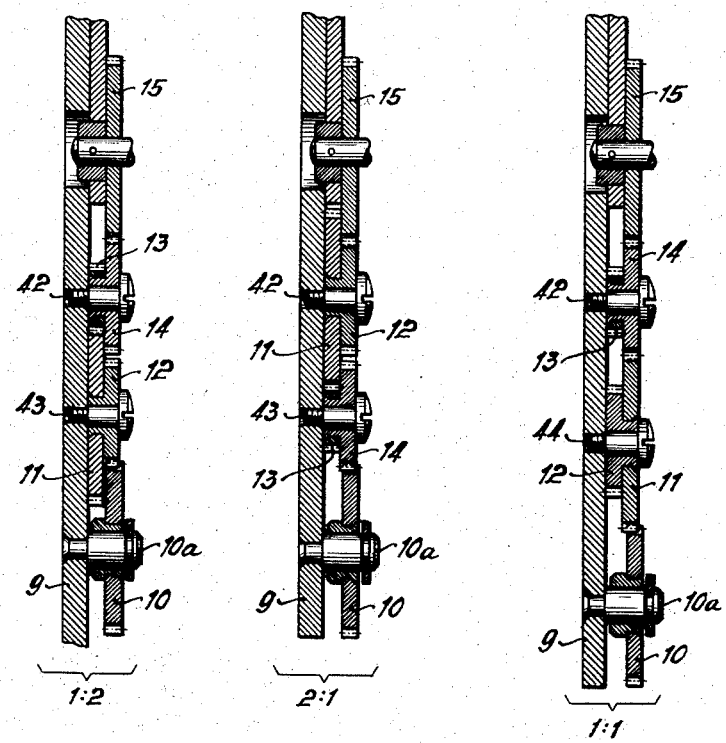

United States Patent Office 2,856,787
Patented Oct. 21, 1958

2,856,787

VARIABLE TRANSMISSION GEARING FOR USE IN TAXIMETERS

Wilhelm Haupt, Villingen, Black Forest, Germany, assignor to Kienzle Apparate G. m. b. H., Villingen, Black Forest, Germany Original application May 24, 1955, Serial No. 510,662. Divided and this application June 4, 1957, Serial No. 663,495

Claims priority, application Great Britain May 25, 1954

7 Claims. (Cl. 74—354)

This application is a divisional application from patent application Serial No. 510,662 filed May 24, 1955.

The present invention relates to taximeters in which it is commonly desired to provide means for changing the ratio of drive from the means which move in accordance with distance travelled to the fare indicating means. However, the possibility must be avoided of the ratio changing means being moved to an intermediate position in which the fare indicating means would not be operated although the vehicle is in use, and the object of the present invention is to achieve this requirement by means of simple construction.

According to the present invention a taximeter is therefore provided having a tariff changing gearing comprising at least two transmission means having different transmission ratios, and means whereby on changing from one transmission means to another both means are momentarily engaged and the means not required is then disengaged by the transmission torque.

It is a further object of the invention to provide ratio changing means for taximeters which are easily accessible, and allow for adapting the taximeter to any changes in the tariff regulations by simple methods.

It is a still further object of the invention to allow for the taximeter to be adapted to any tariff regulations varying in all the countries of the world within an extremely wide range.

The invention will now be more fully described by way of example with reference to the accompanying diagrammatic drawings wherein:

Figure 1 is an elevational view of a taximeter tariff changing gear made in accordance with the invention;

Figure 2 is a sectional view on the line 2—2 on Figure 1;

Figure 7 shows the preliminary transmission gearing operating at the ratio 1:2;

Figure 8 shows the preliminary transmission gearing operating at the ratio 2:1 and Figure 9 shows the preliminary transmission gearing operating at the ratio 1:1.

Figure 3:
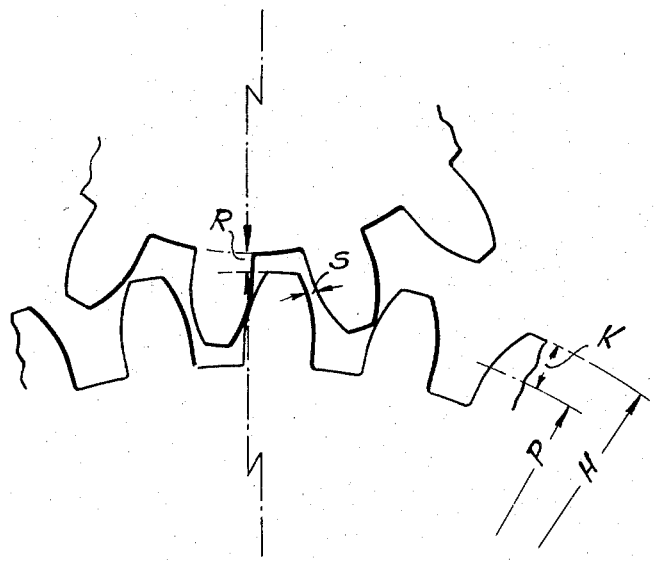
Figure 3 is a view of a detail to be described.

The taximeter has a frame plate 9 in which is journalled a pin 10a that carries a wheel 10 which is driven by suitable means (not shown) in accordance with distance travelled by the vehicle.

The wheel 10 meshes with the smaller pinion 12 of a pair of pinions 11, 12 which are of different size from but co-axial with and firmly connected to each other. The larger pinion 11 meshes with the smaller pinion 13 of another pair of pinions 13, 14 which are also of different size from but co-axial with and firmly connected to each other. The larger pinion 14 meshes with a toothed wheel 15. The wheels 11, 12 are mounted rotatably in a hole 43 of plate 9 and the wheels 13, 14 are mounted rotatably in another hole 42 of plate 9. The wheels 11, 12, 13, 14 provide a preliminary transmission gearing with possible ratios of 1:2, 2:1, and 1:1.

Figs. 7 to 9 show, how these ratios are being set up by means of simply transposing or exchanging the two pairs of wheels 11, 12; 13, 14 with each other. In the position of the wheels shown in Figs. 1 and 7 a transmission ratio of 1:2 has been set up, in which the driving train is as follows 10, 12, 11, 13, 14, 15. To set up a transmission ratio of 2:1 it is only necessary to transpose the two pairs of wheels so that wheels 13, 14 are now mounted in hole 43 of plate 9 and wheels 11, 12 in hole 42 of plate 9, the driving train then being 10, 14, 13, 11, 12, 15.

In order to provide for a transmission ratio of 1:1 wheels 13, 14 will again be mounted in hole 42 of plate 9. Wheels 11, 12 however are for once turned round so that wheel 11 is now on top of wheel 12, and apart from that they are also mounted in another hole 44 also provided in plate 9 for the setting up of this transmission ratio. This hole 44 is necessary to make up for the change in the axial distances of wheels 11 and 14. The driving train is now 10, 11, 14, 15.

The wheel 15 is fixed on a spindle 57 which is rotatably mounted in bearing plates 54, 55 carried by the frame plate 9. The spindle 57 also carries a set of transmission ratio changing gear wheels 58, 59, 60 fixed thereon. Another spindle 56 also rotatably mounted in the plates 54, 55 has fixed thereon an associated set of transmission ratio changing wheels 61, 62, 63 and an output driving wheel 16, which drives the fare indicating means (not shown) through any suitable connections.

Each of the pairs of wheels 58, 61; 59, 62; 60, 63; which are arranged in one plane, represent one transmission ratio of the variable transmission gearing when being brought into driving connection with each other. Thus wheels 58, 61 represent tariff I, wheels 59, 62 tariff II and wheels 60, 63 tariff III. If necessary it is also possible to provide for four and more tariffs or transmission ratios by arranging a corresponding number of additional wheels on axis 56, 57.

To bring the pairs of wheels 58, 61; 59, 62; 60, 63 into driving connection with each other there is provided a set of intermediate wheels 65a, 65b, 65c, mounted between three pairs of arc-shaped swinging arms 66a, 66b, and 66c respectively. The arc-shaped arms 66 are mounted on a bearing pillar 67, which is fitted on or near an extension of the line joining the axis of the intermediate wheels 65 and the axes 57.

This type of mounting for the intermediate wheels has three advantages:

(1) it enables a simple mounting of the swinging arms 66a—66c without frictional loading of the gear shaft 57, (2) wheels 58, 59, 60 on shaft 57 can be exchanged without having first to remove the arms 66a–c.

(3) the intermediate wheels move into mesh in tangential direction with respect to the set of ratio changing gear wheel 58, 59, 60.

Each of the arc-shaped arms 66 has two bores 68, 69 for mounting the intermediate wheels 65, the inner or the outer bore serving as a bearing, as required.

The bearing pin 67 for the lever 66 is furthermore so positioned that the tooth pressure in the set of ratio changing wheels 58, 59, 60 permanently urges the swinging arms 66 and the intermediate wheels 65a–c in clockwise direction (Figure 1) to hold the latter in engagement with the ratio changing wheels 61, 62, 63. To this end the direction of rotation of wheels 58, 59, 60 must be chosen to be clockwise always. The intermediate wheels can therefore move out of engagement should any unusual jamming occur in the mechanism.

Each pair of levers 66a, 66b, 66c carries a two-armed lever 71 lying with their noses 72 on cam discs 73 which are all of them mounted on a shaft 31. This latter can be rotated by the driver of the vehicle according to the required tariff. A 360° rotational movement of this shaft 31 serves to successively switch the taximeter to the following operational positions "For Hire," "Tariff I," "Tariff II," "Tariff III," "Stopped or Cash," back to "For Hire" again. The cam discs 73 correspond in number to the number of tariffs to be switched in, as was already described above with respect to the ratio change wheels 58, 61; 59, 62; 60, 63. For switching in the various tariffs the cam discs 73 are each provided with a lower portion 75, this lower portion 75 being "felt" by the levers 71 with their noses 72. In order to provide for a successive switching in of the various tariffs the cam discs 73 are arranged on shaft 31 with their lower portions 75 angularly transposed against each other, as may be seen from Figs. 5–6 with respect to cam discs 73 for tariffs I and II. From these figures it is also apparent that the lower portions 75 of one cam disc 73 always somewhat overlaps the lower portion 75 of the next following cam disc 73, so that at the moment of switching over from one tariff to the next higher two levers 71 can simultaneously go into engagement with the lower portions 75 of their cam disc 73.

Each lever 71 is urged by one of the springs 70 attached thereto whereby the arms 66 and the intermediate wheels 65a–c are urged towards their engaging positions with the ratio change wheels 61, 62, 63. These springs 70 must be quite weak springs as they only serve to overcome the weight of levers 66a–c, the moving of the intermediate wheels 65a–c into engagement with the ratio change wheels 61—63 being actually brought about by the tooth pressure of the ratio change wheels 58—60. When the springs 70 are made too strong they will hinder the wheels 61—63 to throw out the intermediate wheels 65a–c when the tooth pressure in one of the wheels 61—63 is stronger than the tooth pressure of the corresponding wheels 58—60 plus the force of the spring 70. It must be noted that all of the intermediate wheels 65a–c are in permanent engagement with their corresponding ratio change wheels 58—60.

Fig. 1 also shows that an adjustment of the interaxial distances between the intermediate wheels and the ratio change wheels 61, 62, 63 is effected by means of setscrews 74 in longitudinal slots 76. The interaxial distances between the intermediate wheels 65a–c and the ratio change wheels 58—60 can be adjusted by mounting the intermediate wheels 65a–c in the bore 69 or in the bore 68 of the lever 66a–c. For these reasons it is possible to adapt the taximeters to any change in the tariff regulations by simply exchanging any number of wheels 58—60, 61—63 and 65a–c and readjusting the interaxial distances of the new wheels. In such cases care only must be taken to maintain a constant total number of teeth between each of the intermediate wheels 65a–c and its corresponding ratio change wheel 58—60.

Figure 6:
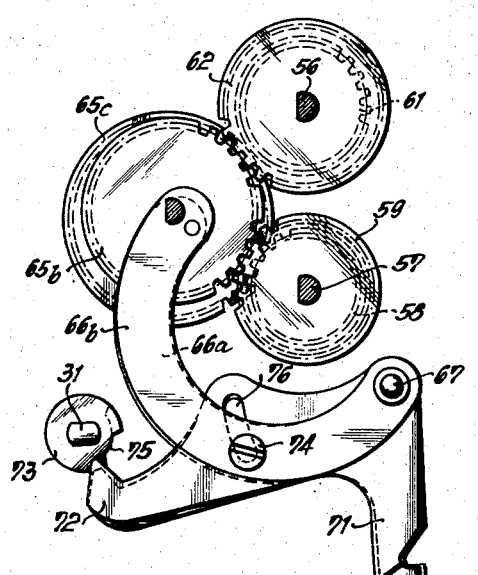
Figure 6 shows the same details again in the positions in which tariff II only is in engagement.
Figure 5:
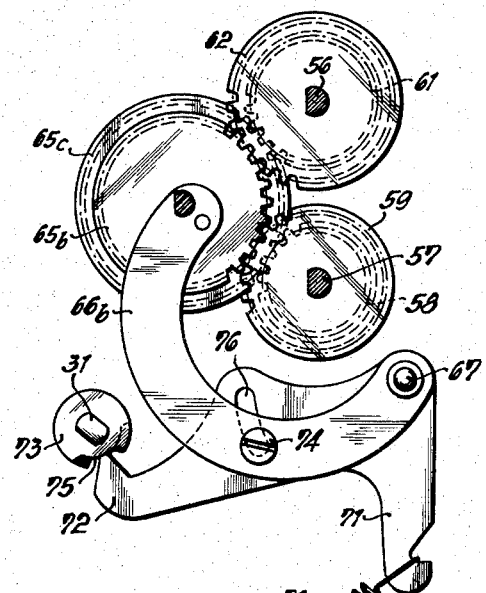
Figure 5 shows the same details at the moment of switching over from tariff I to tariff II in which both intermediate wheels are in engagement.
Figure 4:
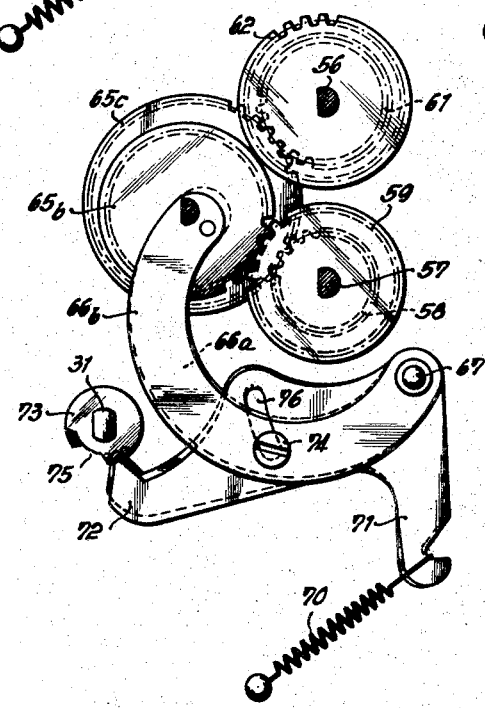
Figure 4 shows details to be described in the positions in which tariff I is in mesh.

For the operation of the device special attention is directed to Figs. 4 to 6, in which those parts only have been shown which relate to the switching in of tariff I and II. When the taximeter is switched from the "For Hire" to "Tariff I" position shaft 31 is turned so that lever 71 belonging to tariff I can go down on to the lower portion 75 of its cam disc 73. In this position, which is shown in Fig. 4, intermediate wheel 65c is therefore in engagement with ratio change wheel 61 driving the taximeter at tariff I. In this driving position lever 71 belonging to tariff II rests with its nose 72 on the higher position of its cam 73, so that intermediate wheel 65b representative of tariff II is kept out of engagement with ratio change wheel 62.

When the taximeter is now switched over from tariff I to tariff II by rotation of shaft 31, lever 71 belonging to tariff II will immediately be allowed to go down to the lower portion 75 of its cam disc 73, because, as was already described above, the lower portions 75 of cam discs 73 overlap somewhat. This moment of switching over is shown in Fig. 5. The lever 71 of tariff II going down to the lower portion 75 of its cam disc 73 will bring intermediate wheel 65b into engagement with ratio change wheel 62, driving motion now being simultaneously transferred from axis 57 to axis 56 via wheels 58, 65c, 61 and wheels 59, 65b, 62. The transmission ratio of wheels 59, 65b, 62 representative of tariff II being higher than that of wheels 58, 65c, 61 representative of tariff I, shaft 56 will be accelerated at the moment of switching over. This means that wheel 61 will also accelerate and will therefore owing to its increased tooth pressure push out the intermediate wheel 65c which is driven at the same speed as wheel 58 and shaft 57, which latter two are not accelerated by the switching over from tariff I to tariff II.

When the switching over from tariff I to tariff II is completed the parts take up the position shown in Fig. 6, in which lever 71 of tariff I lies on the higher portion of its cam 73 so that intermediate wheel 65c is positively kept out of engagement with ratio change wheel 61. At this time lever 71 of tariff II rests on the lower portion of its cam 73 keeping intermediate wheel 65b in engagement with ratio change wheel 62. In this way, the special advantage is achieved that in switching over from one tariff to the next higher it is impossible at any moment, for all the ratio changing wheels to be out of engagement at once, thus effectively preventing any attempt to switch the taximeter out of use by trying to find an intermediate position between the tariffs.

The lever 71 in conjunction with each pair of levers 66 and the associated wheels belonging to them form a unit for each tariff, so that in the case of an apparatus for three tariff rates there are three such units. With two tariff taximeters correspondingly fewer units are needed, the missing units being replaced by spacing tubes. The wheels 15, 16, 17, 58 to 63 and 65a, 65b, 65c are all similar to each other. That is to say, the wheels are similar in the following respects:—

(1) The tooth shape is the same and this is the modified involute shape in which the head of the tooth ($k$ in Figure 3) is slightly greater than the module ($m$), e. g. $k=m+0.2.m$, which means that the axial distance between two wheels will have to be enlarged correspondingly. The pitch diameter $(p)=m\ t$, where $t=$ the number of teeth. The head circle diameter of the wheels therefore increases by the amount of the enlargement of the tooth heads, i. e. by $2\times(m+0.2\ m.)$, which gives a formula $(H)=m\ t+(2\times 1.2\ m.)$ for the diameter of the head circle. This results in a flank clearance S and a radial clearance R for the involute teeth, which are otherwise free from backlash.

(2) The internal periphery is the same, e. g. D-shape or other suitable non-circular shape for being fixed on their spindle against rotary motion with respect to their spindle.

By this means all, or practically all, the wheels in the taximeter may be selected from a small number of standard wheels and change of ratios in the various gear trains can be readily made.

I claim:

1. In a taximeter having fare indicating means driven according to the movement of an element that is actuated in accordance with time and distance, the provision of at least two transmission devices of different transmission ratios operatively connected between said indicating means and said element, each device having a plurality of drive transmitting members operatively connected with each other, one member of each device being disengageable from at least one other member of each device, resilient means for urging the disengageable members into engagement with said other members, a ratio control element, ratio changing means actuated by said element which ratio changing means in a first position permits engagement of the disengageable member of the first device while holding the disengageable member of the second device out of engagement, and in a second position holds the disengageable member of the first device out of engagement and permits engagement of the disengageable member of the second device and during changing from the first position to the second permits engagement of both said disengageable members, whereupon the disengageable member of the first device is urged out of engagement by the increased speed imparted to said other member of the first device by the second device.

2. In a taximeter having fare indicating means driven according to the movements of an element that is actuated in accordance with time and distance; the provision of two axles, two sets of ratio changing gear wheels fixed respectively on said axle and operatively connected to said indicating means and said element respectively, a plurality of intermediate wheels each mounted for movement into and out of mesh with one of each set of the ratio changing wheels, resilient means for urging the intermediate wheels towards their meshing positions, and ratio changing means movable into a plurality of positions in the first of which said positions, the first of said intermediate wheels is permitted to mesh while the second intermediate wheel is held out of mesh, while in the second position of said ratio changing means the first intermediate wheel is held out of mesh and the second intermediate wheel is permitted to mesh, said ratio changing means permitting both intermediate wheels to mesh during changing from said first to said second position whereupon the first intermediate wheel is urged out of engagement by the increased speed imparted to the ratio changing gear wheels by the engagement of the second intermediate wheel.

3. In a taximeter having fare indicating means driven according to the movement of an element that is actuated in accordance with time and distance; the provision of two axles, two sets of ratio changing gear wheels fixed respectively on said axles and operatively connected to said indicating means and said element respectively, each said set being spaced from the other set, a plurality of intermediate wheels, means for mounting said intermediate wheels movable tangentially to one of said sets of gear wheels into and out of mesh with one of said other set of the ratio changing wheels, resilient means for urging the intermediate wheels towards their meshing positions, and ratio changing means movable into a plurality of positions in the first of which said positions, the first of said intermediate wheel is permitted to mesh while the second intermediate wheel is held out of mesh, while in the second position of said ratio changing means the first intermediate wheel is held out of mesh and the second intermediate wheel is permitted to mesh, said ratio changing means permitting both intermediate wheels to mesh during changing from said first to said second position whereupon the first intermediate wheel is urged out of engagement by the increased speed imparted to the ratio changing gear wheels by the engagement of the second intermediate wheel.

4. In a taximeter having fare indicating means driven according to the movement of an element that is actuated in accordance with time and distance; the provision of two axles, two sets of ratio changing gear wheels fixed respectively on said axles and operatively connected to said indicating means and said element respectively, each set being spaced from the other set, a plurality of intermediate wheels, a plurality of arms each pivotally mounted on a first axis and having one of said intermediate wheels rotatably mounted thereon on a second axis, said first and second axles being disposed on diametrically opposite sides of one of said axles so that the intermediate wheels are movable tangentially of the gear wheels on the latter axle, said arms being movable for bringing the intermediate wheels into and out of mesh with one of said other set of the ratio changing wheels, resilient means for urging the arms in the direction to bring the intermediate wheels towards their meshing positions, and ratio changing means movable into a plurality of positions in the first of which said positions, the first of said intermediate wheels is permitted to mesh while the second intermediate wheel is held out of mesh while in the second position of said ratio changing means the first intermediate wheel is held out of mesh and the second intermediate wheel is permitted to mesh, said ratio changing means permitting both intermediate wheels to mesh during changing from said first to said second position whereupon the first intermediate wheel is urged out of engagement by the increased spaced imparted to the ratio changing gear wheels by the engagement of the second intermediate wheel.

5. In a taximeter having fare indicating means driven according to the movements of an element that is actuated in accordance with time and distance; the provision of two axles, two sets of ratio changing gear wheels fixed respectively on said axles and operatively connected to said indicating means and said element respectively, each set being spaced from the other set, plurality of intermediate wheels, a plurality of arms each pivotally mounted on a first axis and having one of said intermediate wheels rotatably mounted thereon on a second axis, said first and second axles being disposed on diametrically opposite sides of one of said axles so that the intermediate wheels are movable tangentially of the gear wheels on the latter axle, said arms being movable for bringing the intermediate wheels into and out of mesh with one of said other set of the ratio changing wheels, resilient means for urging the arms in the direction to bring the intermediate wheels towards their meshing positions, levers fixed adjustably to the arms respectively, and ratio changing cams engaging said levers respectively and movable into a plurality of positions in the first of which said positions, the first of said intermediate wheels is permitted to mesh while the second intermediate wheel is held out of mesh, while in the second position of said ratio changing cams the first intermediate wheel is held out of mesh and the second intermediate wheel is permitted to mesh, said ratio changing cams permitting both intermediate wheels to mesh during changing from said first to said second position whereupon the first intermediate wheels is urged out of engagement by the increased speed imparted to the ratio changing gear wheels by the engagement of the second intermediate wheel, the relative adjustment of the arms and levers serving to effect adjustment of the intermediate wheels according to the diameters of the intermediate wheels and said gear wheels.

6. In a taximeter having fare indicating means driven according to the movement of an element that is actuated in accordance with time and distance; the provision of two axles, two sets of ratio changing gear wheels fixed respectively on said axles and operatively connected to said indicating means and said element respectively, a plurality of intermediate wheels each mounted for movement into and out of mesh with one of each set of the ratio changing wheels, resilient means for urging the intermediate wheels towards their meshing position, ratio changing means movable into two positions in the first of which said positions, the first of said intermediate wheels is permitted to mesh while the second intermediate wheel is held out of mesh, while in the second position of said ratio changing means the first intermediate wheel is held out of mesh and the second intermediate wheel is permitted to mesh, said ratio changing means permitting both intermediate wheels to mesh during changing from said first to said second position, said resilient means comprising springs which are too weak to provide effective driving engagement of the intermediate wheels with the ratio changing wheels, said driving engagement being increased by the tooth pressure between said ratio changing wheels and said intermediate wheels, said weak springs permitting said first intermediate wheel to be pushed out of engagement with the ratio changing wheels by the engagement of the second intermediate wheel.

7. In a taximeter having fare indicating means driven according to the movement of an element that is actuated in accordance with time and distance; the provision of a first pair of pinions coaxial with each other one smaller than the other, means for transmitting drive from said element to the smaller pinion, a second pair of pinions coaxial with each other one smaller than the other, the smaller pinion of the second pair being in mesh with the larger pinion of the first pair, first and second axles two sets of ratio changing gear wheels fixed respectively on said axles and operatively connected to said indicating means and said element respectively, each said set being spaced from the other set, means for operatively connecting the larger of the second pair of pinions with said first axle, a plurality of intermediate wheels, means for mounting said intermediate wheels movably tangentially to the set of gear wheels on the second axle into and out of mesh with one of each set of the ratio changing wheels, resilient means for urging the intermediate wheels towards their meshing positions, and ratio changing means movable into two positions in the first of which said positions, the first of said intermediate wheels is permitted to mesh while the second intermediate wheel is held out of mesh, while in the second position of said ratio changing means the first intermediate wheel is held out of mesh and the second intermediate wheel is permitted to mesh, said ratio changing means permitting both intermediate wheels to mesh during changing from said first to said second position whereupon the first intermediate wheel is urged out of engagement by the increased speed imparted to the ratio changing gear wheels by the engagement of the second intermediate wheel.

References Cited in the file of this patent

UNITED STATES PATENTS

| | | |
|---|---|---|
| 652,275 | Krastin | June 26, 1900 |
| 829,068 | Fox | Aug. 21, 1906 |
| 1,894,211 | Zink | Jan. 10, 1933 |
| 2,053,795 | Keith et al. | Sept. 8, 1936 |
| 2,342,509 | Gaty et al. | Feb. 22, 1944 |
| 2,538,625 | Moore | Jan. 16, 1951 |

FOREIGN PATENTS

| | | |
|---|---|---|
| 27,084 of 1909 | Great Britain | Aug. 25, 1910 |